Oct. 27, 1959  C. ORR, JR., ET AL  2,909,960
METHOD AND APPARATUS FOR MEASURING ELECTRICAL
CHARGE ON AEROSOL PARTICLES
Filed June 24, 1953  2 Sheets—Sheet 1

INVENTORS
CLYDE ORR, JR.
BARTON LESLIE HINKLE
BY

ATTORNEY

Oct. 27, 1959

C. ORR, JR., ET AL 2,909,960

METHOD AND APPARATUS FOR MEASURING ELECTRICAL
CHARGE ON AEROSOL PARTICLES

Filed June 24, 1953

INVENTORS.
CLYDE ORR, JR.
BARTON LESLIE HINKLE
BY

ATTORNEY

United States Patent Office
2,909,960
Patented Oct. 27, 1959

2,909,960

METHOD AND APPARATUS FOR MEASURING ELECTRICAL CHARGE ON AEROSOL PARTICLES

Clyde Orr, Jr., Atlanta, Ga., and Barton Leslie Hinkle, Gladstone, Va., assignors to Georgia Tech Research Institute, Atlanta, Ga., a corporation of Georgia Application June 24, 1953, Serial No. 363,785

9 Claims. (Cl. 88—14)

This invention relates to electrical measuring devices, and more particularly to a method and apparatus for measuring electrical charge on aerosol particles.

In the past, smoke and other gas-like substances containing particles of very small size have been analyzed as to their electrical charge, in much the same manner as fogs and material containing particles of larger size. This analysis consists of recording photographically the paths traversed by particles as they fall under the influence of gravity through an electrical field. A great number of such paths must be analyzed in order to obtain statistically reliable results. In addition, very slight thermal gradients within the zone traversed by these particles cause thermal currents which are sufficient to invalidate the results.

In general, the technique has only been suitable for use under very closely controlled laboratory conditions; and, in most instances where the particle size of an aerosol is extremely small, the time required to make a specific analysis is very great since the particles tend to be suspended or drop extremely slowly.

Briefly, our method of analyzing the electrical charge on areosol particles includes moving a very thin flat stream of aerosol particles through an analyzing zone while encompassing the stream in a reasonably inert gas traveling at substantially the same velocity as the stream, and at the same time subjecting the stream of aerosol to an electrical field, the charge on the particles being measured by the amount of deflection caused by the electrical field and the intensity of light reflected by increments of a cross-section of the stream.

By controlling the movement of the aerosol particles and by moving these particles at a speed greater than the speed at which they would normally travel due to gravity, the intensity of the electrical field may be increased, thus providing more accurate analysis of the electrical charge on the aerosol particles than has heretofore been attainable.

It is an object of our invention to provide apparatus which will measure the electrical charge on a reasonably large quantity of aerosol particles in a relatively short time.

Another object of our invention is to provide apparatus for measuring the electrical charge on aerosol particles whereby the path of the aerosol particles through the apparatus is controlled.

Another object of our invention is to provide a method of analyzing aerosol particles whereby the effect of thermal changes and gradients on the aerosol particles is minimized.

Another object of our invention is to provide a practical and inexpensive method of substantially accurately measuring the electrical charge on aerosol particles in a reasonably short period of time.

Other and further objects and advantages of our invention will become apparent from the following description when taken in conjunction with the accompanying drawings wherein like characters of reference designate corresponding parts throughout the several views, and wherein.

Figure 1:
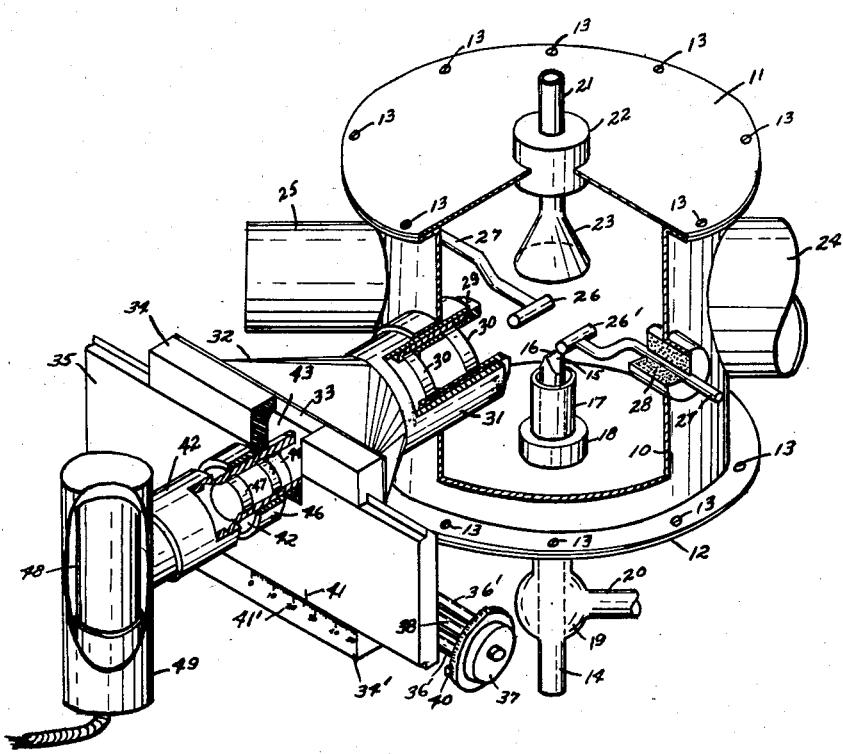
Fig. 1 is a partially broken perspective view of apparatus for analyzing the electrical charge on aerosol particles, constructed in accordance with our invention.

Referring now in detail to the embodiment chosen for purpose of illustration, numeral 10 denotes a cylindrical casing forming a chamber surrounding the analyzing zone of our apparatus. Casing 10 is provided with a flat top 11 and a flat bottom 12 which are removably fixed thereto by bolts 13. To introduce the aersol particles into the analyzing zone, a nozzle consisting of a cylindrical tube 14 terminating in a slotted end 15 projects vertically through bottom 12 and into the analyzing zone. The aerosol to be analyzed passes through tube 14 and through a transverse slit 16 in end 15. Concentrically surrounding tube 14 is a second and larger gas tube 17 which is affixed to bottom 12 by a flexible washer 18. The upper end of tube 17 terminates below end 15 while the lower end thereof is provided with a bulbous member 19 surrounding and joined to the outer periphery of tube 14. Tube 20 which communicates with bulbous member 19 introduces air or an inert gas into bulbous member 19 and thence through tube 17 into the analyzing zone.

Located concentrically above tubes 14 and 17 and passing vertically through the center of top 11 is an exhaust tube 21 which is joined to top 11 by washer 22. The lower end 23 of exhaust tube 21 is belled out to form an inverted funnel-shaped member, the base diameter of which is slightly larger than the diameter of tube 17.

In order to introduce light in a horizontal beam substantially 45° from a vertical plane containing slit 16, a cylindrical member 24 is located on the periphery of cylinder 10 and is provided with a light source (not shown) which directs light horizontally through the analyzing zone located between slit 16 and cone-shaped end 23. Diametrically opposite cylindrical member 24 is a second cylindrical member or light trap 25 which acts to absorb any light received from the light source.

A pair of electrodes 26, 26' are located above slit 16 but below the beam of light projected by the light source. Electrodes 26, 26' are each solid cylindrical conducting members, the axes of which are respectively located in a horizontal plane below a beam of light from the light source and above slit 16. Each of electrodes 26, 26' is also respectively located in a vertical plane equidistant from a vertical plane containing slit 16, and are longer than slit 16 so that when electricity is applied to these electrodes, a uniform electrical field is created across the path of the aerosol. An external source of electricity (not shown) is applied to electrodes 26, 26' respectively through curved conductors 27, 27' which pass through cylinder 10 and are supported thereon by insulators, such as insulator 28, the conductors being slidable within the insulators for adjustment of the position of electrodes 26, 26'.

It will now be seen that if tube 14 is connected to a source of aerosol, tube 20 to a source of inert gas, and a slight vacuum be pulled on tube 21, a thin stream of aerosol surrounded by an inert gas and conforming to the shape of slit 16 will pass vertically through the analyzing zone and into end 23 of tube 21. The light from the light source will illuminate this thin flat stream of aerosol, and if electrodes 26, 26' are appropriately charged, deflection of the charged particles in the aerosol will be obtained.

In order to analyze the stream of aerosol and determine the deflection of the particles contained therein, a detecting member is located in the vertical plane containing slit 16 and in the horizontal plane of the source of light, approximately 135° therefrom. This detecting member includes a lens cylinder 29 containing lenses 30. Lens cylinder 29 threadably engages a sleeve 31 which passes through the periphery of cylinder 10 in such manner that the axis thereof is in the same vertical plane with slit 16. The outer end of sleeve 31 is provided with a funnel-shaped member 32 which supports a projection board 33 and support for rotation a vernier wheel 37 to the outside surface of projection board 33 and slidably retain for transverse movement in a vertical plane, traveling member 35. To control the travel of traveling member 35, a pair of arms 36, 36' project from projection board 33. A pair of opposed brackets 34, 34' are fixed which in turn is provided with a threaded screw 38. A split nut 39 which is fixed to traveling member 35 as illustrated in Fig. 2 rides on threaded screw 38; thus it will be seen that upon rotation of vernier wheel 37, traveling member 35 will be moved either in one direction or the other along the surface of projection board 33. For fine adjustment, a scribe member 40 extends from arm 36 to a position adjacent the scale on vernier wheel 37 so that both may be viewed simultaneously. From an examination of Fig. 1 it will be seen that a scribe mark is provided on the surface of traveling member 35 at numeral 41 and this cooperates with a scale at 41' on bracket 34' so that the position of traveling member 35 with respect to bracket 34' may be observed.

Figure 3:
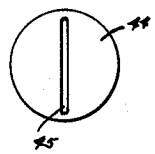
Fig. 3 is a view of a detail.

The scanning member is carried by traveling member 35 and comprises a cylinder 42 which projects through traveling member 35 and through a longitudinal slit 43 in projection board 33. Cylinder 42 contains a split disc 44, illustrated in detail in Fig. 3 which in turn is provided with a vertical slit 45. If desired, disc 44 may be formed of blackened photographic film and slit 45 may be formed by a scratch thereon. Cylinder 42 is held in place on traveling member 35 by a bushing 46. Lenses 47 are located behind disc 44, thus any light passing through slit 45 will be projected down cylinder 42 and onto a photosensitive member such as photomultiply tube 48. The photomultiply tube 48 in the present embodiment is supported in housing 49 and is connected to cylinder 42 as illustrated in the drawings. Electrically, photomultiply tube 48 is connected according to the prior art to a meter (not shown).

Operation

Figure 2:
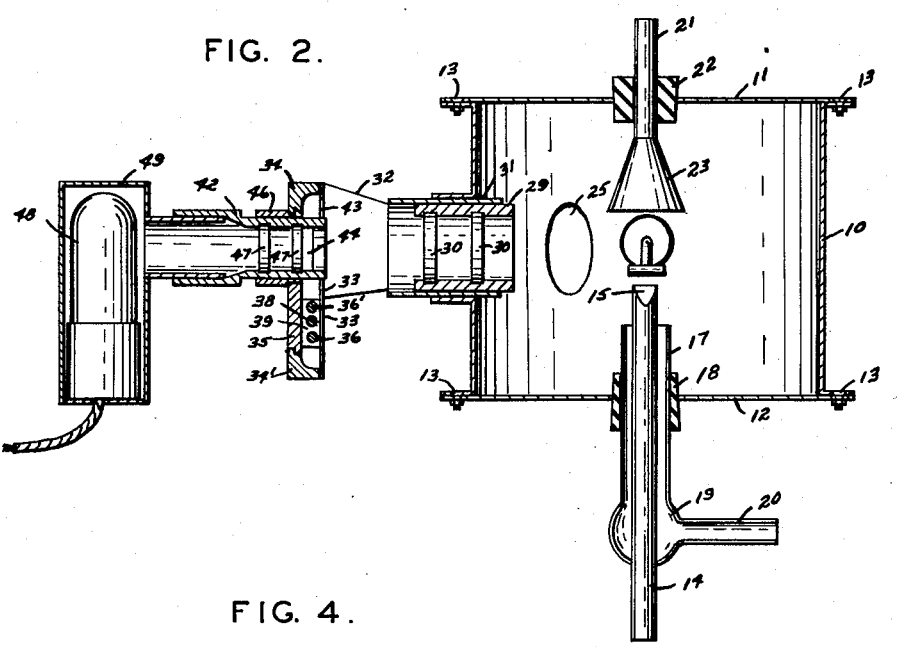
Fig. 2 is a vertical cross-sectional view of the apparatus illustrated in Fig. 1.

The essential operation of our invention is best revealed by an examination of Fig. 1. The aerosol particles are made to enter the chamber through slit 16, flowing upwardly through the chamber and exhausting out of the top through tube 21. The flow may be either upward or downward. Upward flow is generally more satisfactory with very small particle aerosols while downward flow is better with the large particle sizes. If downward flow of the aerosol is desired, the entire apparatus may be rotated 180° as the position of exhaust tube 21, and the nozzle and gas tube 17 interchanged. In event of this interchange, the position of electrodes 26, 26' are changed by rotating curved conductors 27, 27', 180° in their insulators. About the stream of particles as they rise through the chamber is an air stream introduced through tube 17, which by proper adjustment of the flow rate usually above 10 cm./sec., aids in keeping the aerosol stream from spreading when no electrical gradient exists. The orientation of slit 16 is such that the narrowest dimension of the aerosol stream is presented to the detecting member. A beam of light from cylinder 24 enters horizontally and illuminates a portion of the aerosol stream. The electrodes 26, 26' are positioned so that an electrical potential gradient in the neighborhood of 4,000 volts per centimeter of width between the electrodes may be established across the aerosol stream, this electrical potential gradient being of sufficient strength to deflect those particles carrying a single electronic charge or some multiple thereof.

Figure 4:
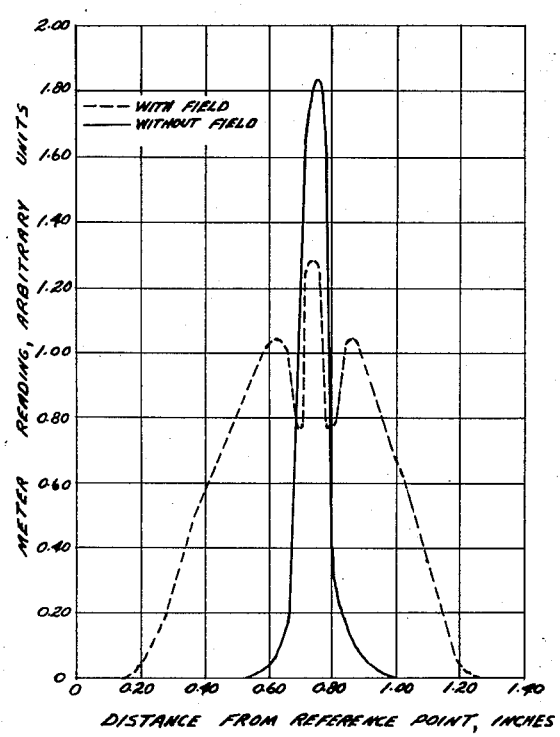
Fig. 4 is a graph of the electrical charge of a typical aerosol substance which passed through the apparatus illustrated in Fig. 1.

In the absence of an electrical field, a single narrow stream is detected when the scanning member is made to traverse by traversing traveling member 35 by rotating vernier wheel 37. A line such as the solid line in Fig. 4 is obtained from plotting the meter reading the photomultiply tube 48 against the position of scanning member as indicated by scribe mark 41, scale 41' and the position of vernier wheel 37. In the presence of an electrical field, the stream of aerosol will be diffused and may result in a curve as illustrated by broken lines in Fig. 4.

Taking into consideration light scattering phenomena, photomultiplier characteristics, etc., the data obtained from the curves as described above reveal the fraction of particles which are neutral, the fraction positively charged and the fraction negatively charged. If the aerosol particles are of uniform size, the data will yield directly the charge distribution; or, if the size distribution of aerosol particles is known, a measure of the charge distribution may be obtained.

Our apparatus may be made to yield information about the electrical characteristics of aerosols which previously have only been attainable by long and arduous efforts. Because thermal currents are insufficient in comparison to the other flow rates employed in our apparatus, precautions which before were absolutely essential are not now required.

The relative positions of the electrodes, light beam and aerosol streams may be varied as desired.

It will be apparent to those skilled in the art that many variations, modifications and changes may be made in the single embodiment chosen for purpose of illustration without departing from the scope of our invention as defined by the following claims.

We claim:

1. Method of analyzing the electrical charge on aerosol particles comprising passing said particles in a flat stream through an analyzing zone, subjecting said particles to an electrical field to divert charged particles in said stream from the normal path of said stream, illuminating said particles with light, and measuring the intensity of light scattered from said particles in a series of planes spaced an incremental distance apart but all parallel to the plane of said flat stream along a plane at right angles thereto.

2. Method as claimed in claim 1 wherein said particles are illuminated by light directed onto said particles from a position substantially 45° from the plane of said flat stream.

3. Method as claimed in claim 1 wherein said particles are illuminated by light directed onto said particles from a position substantially 45° from the plane of said flat stream, and wherein the intensity of light scattered from said particles is measured from a position substantially 135° from the direction of said light.

4. In a method of analyzing the electrical charge on aerosol particles, the steps of passing said particles through an analyzing zone in a flat stream, causing the stream to spread in a direction perpendicular to that of the initial flat stream by an imposed electric field focusing an image formed by light scattered from the stream which has been spread in the perpendicular direction in a plane before a photomultiplier tube and measuring the quantity of light scattered in other planes parallel to the initial image of the flat stream.

5. Apparatus for analyzing the electrical charge on aerosol particles comprising a chamber, a nozzle projecting into said chamber, an exhaust tube projecting into said chamber for creating a partial vacuum in said chamber, said exhaust tube being located opposite said nozzle to define an analyzing zone therebetween, said nozzle being provided with a transverse slit through which a flat stream of said aerosol particles passes upon creation of a partial vacuum in said chamber, a tube surrounding said nozzle and through which a stream of gas passes which substantially surrounds said stream of said aerosol particles and travels at substantially the same velocity therewith, said stream of aerosol particles and said stream of gas passing through said analyzing zone, a pair of electrodes projecting into said chamber and being positioned adjacent said stream of aerosol particles which pass through said analyzing zone for deflecting electrically charged aerosol particles, a beam of light illuminating said stream of aerosol particles, and light detecting means positioned in the plane of said flat stream of aerosol particles to receive light reflected from the particles for detecting the deflection of said electrically charged aerosol particles.

6. Apparatus as claimed in claim 5 wherein said means includes a photosensitive member for recording the deflection of said charged particles.

7. Apparatus as claimed in claim 5 wherein said means includes a photosensitive member for detecting the position and intensity of illumination of said particles in said stream of aerosol particles and in planes parallel to the plane of said stream of aerosol particles.

8. Apparatus as claimed in claim 5 wherein said beam of light illuminates said particles from a position substantially 45° from the plane of said stream of aerosol particles.

9. Apparatus as claimed in claim 5 wherein said beam of light illuminates said particles from a position substantially 45° from the plane of said stream of aerosol particles, and wherein said means for detecting the deflection of said electrically charged particles is positioned substantially 135° from the axis of said beam of light.

References Cited in the file of this patent

UNITED STATES PATENTS

| 2,068,476 | Thomas | Jan. 19, 1937 |
| 2,247,596 | Boer | July 1, 1941 |
| 2,454,757 | Smith | Nov. 23, 1948 |
| 2,535,181 | Way | Dec. 26, 1950 |
| 2,646,880 | Frankel | July 28, 1953 |

OTHER REFERENCES

"The Static Electrification of Dust Particles on Dispersion Into a Cloud," Journal of Applied Physics, vol. 21, August 1950, pages 820–832, Kunkel.

"An Instrument for Determining the Electric Charge Distribution in Aerosols," Canadian Journal of Chemistry, vol. 30, 1952, pages 1056–1068, Gillespie et al.